(12) United States Patent
Montagnon et al.

(10) Patent No.: US 8,152,938 B2
(45) Date of Patent: Apr. 10, 2012

(54) HARDENED MARTENSITIC STEEL, METHOD FOR PRODUCING A COMPONENT FROM THIS STEEL AND COMPONENT OBTAINED IN THIS MANNER

(75) Inventors: Jacques Montagnon, Rambouillet (FR); Philippe Heritier, Clermond-Ferrand (FR); Isabelle Peslerbe, Ollainville (FR); Claude Mons, Savigny le Temple (FR)

(73) Assignees: Aubert & Duval, Paris (FR); SNECMA Moteurs, Paris (FR)

( * ) Notice: Subject to any disclaimer, the term of this patent is extended or adjusted under 35 U.S.C. 154(b) by 0 days.

(21) Appl. No.: 12/869,268

(22) Filed: Aug. 26, 2010

(65) Prior Publication Data
US 2011/0041961 A1 Feb. 24, 2011

Related U.S. Application Data

(62) Division of application No. 11/912,365, filed as application No. PCT/FR2006/000877 on Apr. 20, 2006.

(30) Foreign Application Priority Data

Apr. 27, 2005 (FR) .................................. 05 04254
Jul. 12, 2005 (FR) .................................. 05 07482

(51) Int. Cl.
*C22C 38/44* (2006.01)

(52) U.S. Cl. ........ 148/328; 148/230; 148/578; 148/621; 420/83

(58) Field of Classification Search ............ 420/83; 148/230, 578, 621, 328
See application file for complete search history.

(56) References Cited

U.S. PATENT DOCUMENTS

| | | | |
|---|---|---|---|
| 5,087,415 A * | 2/1992 | Hemphill et al. | 420/95 |
| 5,393,488 A | 2/1995 | Rhoads et al. | |
| 5,873,956 A | 2/1999 | Tanaka et al. | |
| 2003/0094218 A1 | 5/2003 | Nilsson et al. | |

FOREIGN PATENT DOCUMENTS

| | | |
|---|---|---|
| EP | 0 390 468 | 10/1990 |
| EP | 0 962 543 | 12/1999 |
| EP | 1 111 080 | 6/2001 |
| GB | 1 089 934 | 11/1967 |
| GB | 1 243 382 | 8/1971 |
| JP | 2002-161308 | 6/2002 |
| JP | 2002-161342 | 6/2002 |
| JP | 2002-167652 | 6/2002 |
| WO | 01/14601 | 3/2001 |

* cited by examiner

*Primary Examiner* — Jie Yang
(74) *Attorney, Agent, or Firm* — Sughrue Mion, PLLC

(57) ABSTRACT

The invention relates to steel which is characterized by the following composition as expressed in percentages by weight: —C=0.18 0.30%, —Co=5-7%, —Cr=2-5%, —Al=1-2%, —Mo+W/2=1-4%, —V=trace 0.3%, —Nb=trace 0.1%, —B=trace—50 ppm, —Ni=10.5-15% with Ni≧7+3.5 Al, —Si=trace 0.4%, —Mn=trace 0.4%, —Ca=trace—500 ppm, —Rare earths=trace—500 ppm, —Ti=trace—500 ppm, —O=Trace—200 ppm if the steel is obtained by means of powder metallurgy or trace—50 ppm if the steel is produced in air or under a vacuum from molten metal, —N=trace—100 ppm, —S=trace—50 ppm, —Cu=trace—1%, and —P=trace—200 ppm, the remainder including iron and the inevitable impurities resulting from production. The invention also relates to a method of producing a part from said steel and to the part thus obtained.

10 Claims, No Drawings

HARDENED MARTENSITIC STEEL, METHOD FOR PRODUCING A COMPONENT FROM THIS STEEL AND COMPONENT OBTAINED IN THIS MANNER

This is a divisional of application Ser. No. 11/912,365, which is a U.S. National Stage Application of Application No. PCT/FR2006/000877 filed Apr. 20, 2006, the disclosures of which are incorporated herein by reference in their entirety.

The invention relates to a martensitic steel which is hardened by means of a duplex system, that is to say, by means of precipitation of intermetallic compounds and carbides obtained using appropriate composition of the steel and thermal ageing processing operation.

This steel must have:
- a very high level of mechanical strength, but with a high level of toughness and ductility at the same time, that is to say, a low level of sensitivity to brittle fracture; this very high level of strength must remain at high temperatures, that is to say, at temperatures in the order of 400° C.;
- good properties in terms of fatigue, which involves in particular the absence of harmful inclusions such as TiN and oxides; this feature must be obtained by means of an appropriate composition and carefully controlled production conditions for the liquid metal.

Furthermore, it must be case-hardenable and nitridable in order to be able to harden the surface thereof in order to confer thereon a high level of resistance to abrasion.

The main application envisaged for this steel is the production of transmission shafts, in particular for aircraft engines.

The requirement for an excellent level of mechanical strength at high temperatures does not allow the use, in this application, of carbon steels whose strength degrades from 200° C. Maraging steels are conventionally used which have a satisfactory level of strength up to 350-400° C. Beyond this level, a tempering operation is brought about which modifies their structure.

A steel composition has been proposed in document U.S. Pat. No. 5,393,388 which is intended to improve the heat-resistance and in particular improve the properties in terms of fatigue, ductility and toughness. This composition has the disadvantage of requiring a high content of Co (from 8 to 16%), which makes the steel very costly.

The object of the invention is to provide a steel which can be used, in particular for producing mechanical components, such as transmission shafts or structural elements which have a further improved level of mechanical strength at high temperatures but also properties in terms of fatigue and a level of brittleness which are still suitable for these applications. This steel is also intended to have a lower production cost than the most effective steels currently known for these applications.

To this end, the invention relates to a steel, characterised in that the composition thereof is, in percentages by weight:
- C=0.18-0.30%
- Co=5-7%
- Cr=2-5%
- Al=1-2%
- Mo+W/2=1-4%
- V=trace levels—0.3%
- Nb=trace levels—0.1%
- B=trace levels—50 ppm
- Ni=10.5-15% with Ni$\geq$7+3.5 Al
- Si=trace levels—0.4%
- Mn=trace levels—0.4%
- Ca=trace levels—500 ppm
- Rare earth elements=trace levels—500 ppm
- Ti=trace levels—500 ppm
- O=trace levels—200 ppm if the steel is obtained by means of powder metallurgy, or trace levels—50 ppm if the steel is obtained by means of production in air or under vacuum from liquid metal
- N=trace levels—100 ppm
- S=trace levels—50 ppm
- Cu=trace levels—1%
- P=trace levels—200 ppm the remainder being iron and inevitable impurities resulting from the production operation.

Preferably, it contains C=0.20-0.25%.
Preferably, it contains Cr=2-4%.
Preferably, it contains Al=1-1.6%, more preferably 1.4-1.6%.
Preferably, it contains Mo$\geq$1%.
Preferably, it contains Mo+W/2=1-2%.
Preferably, it contains V=0.2-0.3%.
Preferably, it contains Nb=trace levels—0.05%.
Preferably, it contains Si=trace levels—0.25%, more preferably trace levels—0.10%.
Preferably, it contains Mn=trace levels—0.25%, more preferably trace levels—0.10%.
Preferably, it contains Ti=trace levels—100 ppm.
Preferably, it contains O=trace levels—10 ppm.
Preferably, it contains N=trace levels—50 ppm, more preferably trace levels—10 ppm.
Preferably, it contains S=trace levels—10 ppm, more preferably trace levels—5 ppm.
Preferably, it contains P=trace levels—100 ppm.
Preferably, the martensitic conversion temperature Ms thereof is greater than or equal to 140° C., with Ms=550−350×Co %−40×Mn %−17×Cr %−10×Mo %−17×Ni %−8×W %−35×V %−10×Cu %−10×Co %+30×Al %° C.

The invention also relates to a method for producing a component from steel, characterised in that it comprises the following steps prior to the finishing of the component which provides the component with its definitive shape:
- the preparation of a steel having the above composition;
- the forging of this steel;
- a softening tempering operation at 600-675° C. for from 4 to 20 hours followed by cooling in air;
- solution heat treatment at 900-1000° C. for at least 1 hour, followed by cooling in oil or air which is sufficiently rapid to prevent the precipitation of intergranular carbides in the austenite matrix;
- optionally a cryogenic processing operation at −50° C. or lower, preferably at −80° C. or lower, in order to convert all the austenite into martensite, the temperature being 200° C. or more lower than Ms, at least one of the processing operations lasting at least 2 hours;
- optionally a processing operation for softening the martensite so obtained carried out at 150° C.-250° C. for from 4-16 hours, followed by cooling in still air;
- a hardening ageing operation at 475-600° C., preferably from 490-525° C. for from 5-20 h.

The component may also be subjected to a nitriding operation or a case-hardening operation.

The invention also relates to a mechanical component or structural element component, characterised in that it is produced in accordance with the above method.

It may be inter alia an engine transmission shaft, an engine suspension device or a landing gear element.

As will have been appreciated, the invention is firstly based on a steel composition which is distinguished from the prior art in particular by a lower content in terms of Co. The contents of the other alloy elements are adjusted in accordance therewith, in particular the contents of Al, Mo, W, Ni. An optimised thermal processing operation is also proposed.

These steels have a plastic domain (difference between tensile strength $R_m$ and yield strength $R_{p0.2}$) which is midway between those of carbon steels and maraging steels. For maraging steels, the difference is very low, resulting in a high yield strength but a rapid rupture as soon as it is exceeded. The steels of the invention have, in this respect, properties which can be adjusted by the proportion of hardening phases and/or carbon.

The steel of the invention may be machined in the quenched state, using tools which are suitable for a hardness of 45 HRC. It is midway between maraging steels (which can be machined in the unprocessed quenched state since they have a soft martensite with low carbon) and carbon steels which must be machined in the annealed state.

The invention is based on obtaining a hardening operation which is carried out conjointly using intermetallic compounds of the type β-NiAl and carbides of the type $M_2C$, and on the presence of reversion austenite formed during the hardening ageing operation, which provides ductility for the martensite by forming a sandwich structure (a few % of reversion austenite between the laths of martensite).

The formation of nitrides must be prevented, in particular Ti and Al which have an embrittling effect; any addition of Ti is therefore eliminated (maximum allowed: 500 ppm, more preferably 100 ppm), and N is limited to a value as low as possible, by fixing it in order to prevent the formation of AlN.

The $M_2C$ carbides of Cr, Mo, W and V which contain very little Fe are preferred for their hardening and non-embrittling properties. They are stabilised by Mo and W. The total of the content in terms of Mo and half of the content of W must be at least 1%. Mo+W/2=4% must not be exceeded so as not to impair the forgeability and not to form intermetallic compounds of the μ phase of the type $Fe_7Mo_6$ (see also Cr and V). Preferably, Mo+W/2 is between 1 and 2%.

Cr and V are precursors to the stabilisation of the $M_2C$ which are "metastable" carbides. V forms carbides which "block" the joints of the grains and limit the enlargement of the grains during thermal processing operations at high temperature. V=0.3% must not be exceeded so as not to promote the formation of undesirable intermetallic compounds of the μ phase. Preferably, the content of V is between 0.2 and 0.3%.

The presence of Cr (at least 2%) allows the level of V carbides to be decreased and the level of $M_2C$ to be increased. 5% must not be exceeded so as not to form μ phase, then $M_{23}C_6$ carbides. Preferably, 4% is not exceeded.

The presence of C promotes the appearance of $M_2C$ relative to the μ phase. However, an excessive content causes segregations and a reduction of Ms. The content thereof must be between 0.18 and 0.30%, preferably from 0.20-0.25%.

Co delays the restoration of the dislocations and therefore slows down the excessive ageing mechanisms in the martensite at high temperatures. It thus allows a high level of heat resistance to be maintained. However, it is suspected that, since Co promotes the formation of the μ phase mentioned above, which is the one which hardens the maraging steels of the prior art having Fe—Ni—Co—Mo, the significant presence thereof contributes to reducing the quantity of Mo and/or W available to form $M_2C$ carbides which contribute to the hardening according to the mechanism which it is desirable to promote. The content of Co proposed (from 5 to 7%) in combination with the contents of other elements, is the result of a compromise between these various advantages and disadvantages.

Ni and Al are connected. If the level of Al is too high relative to Ni, there is no longer any potential for reversion austenite. If there is too much Ni, the level of hardening phase of the type NiAl is reduced to an excessive extent and Al remains largely in solution. At the end of the quenching operation, there must be no residual austenite and a martensitic structure must be left. To this end, if a quenching operation with solid $CO_2$ is used, Ms must be $\geqq 140°$ C. Ms is calculated in accordance with the conventional formula: Ms=550−350×C %−40×Mn %−17×Cr %−10×Mo %−17×Ni %−8×W %−35×V %−10×Cu %−10×Co %+30×Al %° C. The content of Ni must be adjusted to this end in accordance with the other elements. It is necessary to have Al=1-2%, preferably from 1-1.6%, more preferably from 1.4-1.6% and Ni=10.5-15%, with Ni$\geqq$7+3.5 Al. Ideally, there is 1.5% of Al and from 12-13% of Ni. These conditions promote the presence of NiAl which increases the tensile strength $R_m$, which has also been found not to deteriorate with a relatively low content of Co. The yield strength $R_{p0.2}$ is influenced in the same manner as $R_m$.

Compared with the steels known from U.S. Pat. No. 5,393,388, in which a very high presence of reversion austenite is desired in order to provide a high level of ductility and toughness, the invention promotes the presence of the hardening B2 phases, in particular NiAl, in order to obtain a high level of mechanical strength at high temperatures. Compliance with the conditions set out with respect to Ni and Al ensures a potential content of reversion austenite sufficient to retain a level of ductility and toughness appropriate for the applications envisaged.

It is possible to add B, but no more than 50 ppm so as not to degrade the forgeability of the steel.

A feature of the invention is also the possibility of replacing at least a portion of Mo with W. With an equivalent atomic fraction, W segregates less during solidification than Mo and provides mechanical strength at high temperatures by the formation of carbides which are very stable in terms of temperature. It has the disadvantage of being costly and it is possible to optimise the cost by associating it with Mo. As stated, Mo+W/2 must be between 1 and 4%, preferably between 1 and 2%. It is preferable to retain a minimum content in terms of Mo of 1% in order to limit the cost of the steel.

N may be up to 100 ppm if the steelmaking is carried out in air and if N is fixed in carbonitrides of Nb and/or V in order to prevent the formation of the embrittling nitride AlN. It is preferable to carry out the steelmaking under vacuum in order to have N$\leqq$50 ppm, or $\leqq$10 ppm.

Cu may be up to 1%. It is capable of being involved in the hardening operation using its epsilon phase and the presence of Ni allows the harmful effects thereof to be limited.

Generally, elements which are able to segregate at the joints of the grains and embrittle them, such as P and S, must be controlled within the following limits: S=trace levels—50 ppm, preferably trace levels—10 ppm, more preferably trace levels—5 ppm, and P=trace levels—200 ppm, preferably trace levels—100 ppm.

It is possible to use Ca as a deoxidising agent, it being ultimately found in residual quantities ($\leqq$500 ppm). In the same manner, residues of rare earth elements may ultimately remain ($\leqq$500 ppm) following a processing operation for refining the liquid metal.

The acceptable content of oxygen varies depending on whether the steel has been obtained by means of powder metallurgy or by means of production from liquid metal in air or under vacuum. In the first instance, a content of up to 200 ppm is tolerated. In the second instance, the maximum content is 50 ppm, preferably 10 ppm.

By way of examples, samples of steel were tested whose compositions (in percentages by weight) are set out in Table 1:

TABLE 1

Composition of the samples tested

|  | A (reference) | B (reference) | C (invention) | D (invention) | E (invention) |
|---|---|---|---|---|---|
| C % | 0.233 | 0.247 | 0.239 | 0.244 | 0.247 |
| Si % | 0.082 | 0.031 | 0.031 | 0.037 | 0.030 |
| Mn % | 0.026 | 0.030 | 0.033 | 0.033 | 0.030 |
| S ppm | 1.0 | 7.3 | 3.8 | 6.1 | 6.7 |
| P ppm | 54 | <30 | <30 | <30 | <30 |
| Ni % | 13.43 | 13.31 | 12.67 | 12.71 | 13.08 |
| Cr % | 2.76 | 3.08 | 3.38 | 3.38 | 3.29 |
| Mo % | 1.44 | 1.53 | 1.52 | 1.53 | 1.53 |
| Al % | 0.962 | 1.01 | 1.50 | 1.50 | 1.49 |
| Co % | 10.25 | 10.35 | 6.18 | 6.24 | 6.33 |
| Cu % | 0.014 | <0.010 | 0.011 | 0.012 | 0.011 |
| Ti % | <0.020 | <0.020 | <0.020 | <0.020 | <0.020 |
| Nb % | <0.0050 | <0.0050 | <0.0050 | <0.0050 | 0.054 |
| B ppm | <10 | <5 | <5 | 29 | <5 |
| Ca ppm | <50 | <50 | <50 | <50 | <50 |
| N ppm | <3 | 13 | 13 | 12 | 14 |
| O ppm | <3 | 4.8 | 3.4 | 4.4 | 7.7 |
| V % | <0.010 | 0.252 | 0.245 | 0.254 | 0.253 |

Reference steel A corresponds to a steel according to U.S. Pat. No. 5,393,388, therefore having a high content of Co.

Reference steel B corresponds to a steel which is comparable to steel A, to which V has been added without the content of Co being modified.

Steel C corresponds to the invention, in particular in that, compared with steels A and B, the Al content thereof has been increased and the Co content thereof has been decreased.

Steel D according to the invention was further subjected to an addition of B.

Steel E according to the invention was further subjected to an addition of Nb.

These samples were forged from ingots of 200 kg in the form of flat bars of 75×35 mm under the following conditions. A homogenisation processing operation of at least 16 hours at 1250° C. is followed by a first forging operation which is intended to divide the rough structures of the ingots; semi-finished products having a cross-section of 75×75 mm were then forged after being brought to temperature again at 1180° C.; finally, each semi-finished product was placed in an oven at 950° C., then forged at this temperature in the form of flat bars of 75×35 mm whose granular structure is refined by these successive operations.

After forging, the samples were subjected to:
- solution heat treatment at 900° C. for 1 hour, then cooling in air;
- a cryogenic processing operation at −80° C. for 8 hours;
- a hardening ageing operation at 495° C. for 5 hours, then cooling in air.

The properties of the samples (tensile strength $R_m$, elastic limit Rp0.2, elongation A5d, contraction Z, resilience KV, HRC hardness, ASTM grain size) are set out in Table 2. In this instance, they are measured at normal ambient temperature.

TABLE 2

Properties of the samples tested

|  | $R_m$ (Mpa) | Rp0.2 (Mpa) | A5d (%) | Z (%) | KV (J) | HRC | Grain ASTM |
|---|---|---|---|---|---|---|---|
| A | 2176 | 1956 | 11.2 | 58 | 25/27 | 55.3 | 8 |
| B | 2218 | 2002 | 9.9 | 56 | 26/30 | 56.3 | 8/9 |
| C | 2316 | 2135 | 9.5 | 49 | 20/24 | 57.6 | 8 |
| D | 2328 | 1997 | 8.9 | 43 | 21/22 | 57.9 | 8 |
| E | 2303 | 1959 | 10 | 47 | 16/19 | 57.6 | 9 |

It can be seen that the samples C, D and E according to the invention have a tensile strength which is far greater than that of the reference samples A and B. The elastic limit is at least of the same order of magnitude. In contrast to this measurement of the tensile strength, the properties of ductility (reduction of area and elongation at break) and resilience are reduced if the thermal processing operation described is carried out.

The reference sample B indicates that the addition of only V to the steel A brings about an improvement of only specific properties, and in proportions which are most often less than in the case of the invention.

In particular, the increase of Al in the case of the invention, together with retaining a high content of Ni, renders the hardening phase NiAl more present and is a substantial factor in the improvement of the tensile strength.

The additions of B and Nb of the samples D and E respectively are not necessary in order to obtain the high levels of mechanical strength which are the intended priority in the invention.

Additional experiments which were carried out, in particular on sample C, have allowed it to be determined that, in addition to the processing operations carried out, a softening tempering operation at a temperature of at least 600° C. prior to the dissolution was necessary in order to obtain a complete recrystallisation of the steel during the solution heat treatment. This softening tempering operation may, for example, be carried out at 650° C. for 8 hours and may be followed by cooling in air. Owing to this, the products directly resulting from the thermomechanical transformation may be readily subjected to the finishing operations (rectification, peeling, machining . . . ) which confer on the component its definitive shape.

After this softening tempering operation at 650° C. for 8 hours and cooling in air, a solution heat treatment at 935° C.

for one hour, followed by cooling in oil, then a cryogenic processing operation at −80° C. for 8 hours, then a stress-relieving operation at 200° C. for 8 hours (on tensile test-pieces) or 16 hours (on resilience test-pieces), then an ageing operation at 500° C. for 12 hours, followed by cooling in air allowed an ASTM grain size of 8 and the following mechanical properties to be obtained:

in a longitudinal direction, at 20° C.: $R_m$=2271 MPa; $R_{p0.2}$=1983 MPa; A5d=11.8%; Z=57%; KV=27 J;

in a transverse direction at 20° C.: $R_m$=2273 MPa; $R_{p0.2}$=2023 MPa; A5d=8.8%; Z=41%; KV=22-24 J;

in a longitudinal direction at 400° C.: $R_m$=1833 MPa; $R_{p0.2}$=1643 MPa; A5d=11.1%; Z=58%.

In a longitudinal direction at 20° C., there is therefore an excellent compromise between tensile strength, ductility and resilience. In the transverse direction, the resilience values remain acceptable. And, at 400° C., the tensile strength remains very high and the steel of the invention therefore overcomes the problems addressed in a very effective manner.

Generally, an optimised method for thermally processing the steel according to the invention in order to ultimately obtain a component which has the desired properties is, after forging the blank of the component and before the finishing operation which gives the component its definitive shape:

softening annealing operation at 600-675° C. for from 4 to 20 hours followed by cooling in air;

solution heat treatment at 900-1000° C. for at least one hour, followed by cooling in oil or air which is sufficiently rapid to prevent the precipitation of intergranular carbides in the matrix of austenite;

optionally a cryogenic processing operation at −50° C. or lower, preferably at −80° C. or lower, in order to convert all the austenite into martensite, the temperature being 200° C. or more lower than Ms, at least one of the processing operations lasting at least 2 hours; for the compositions which have in particular a relatively low content of Ni, this cryogenic processing operation is less advantageous;

optionally a processing operation for softening the martensite obtained after quenching carried out at 150-250° C. for from 4-16 hours, followed by a cooling operation in still air;

a hardening ageing operation at 475-600° C., preferably from 490-525° C. for from 5 to 20 hours.

The preferred applications of the steel according to the invention are durable components for mechanical engineering and structural elements, for which it is necessary to have a tensile strength at low temperatures of between 2200 MPa and 2350 MPa, combined with values of ductility and resilience which are at least equivalent to those of the best high-strength steels, and at high temperatures (400° C.) a tensile strength in the order of 1800 MPa and optimum fatigue properties.

The steel according to the invention also has the advantage of being case-hardenable and nitridable. It is therefore possible to confer a high level of abrasion resistance on the components which use this steel. This is particularly advantageous in the cited envisaged applications.

What is claimed is:

1. Mechanical component or structural element component, characterized in that it is produced in accordance with a method for producing a component from steel, characterized in that the method comprises the following steps prior to the finishing of the component which provides the component with its definitive shape:

preparing a steel characterized in that the composition thereof is, in percentages by weight:

C=0.18-0.30%
Co=5-7%
Cr=2-5%
Al=1-2%
Mo+W/2=1-4%
V=trace levels—0.3%
Nb=trace levels—0.1%
B=trace levels—50 ppm
Ni=10.5-15% with Ni≧7+3.5 Al
Si=trace levels—0.4%
Mn=trace levels—0.4%
Ca=trace levels—500 ppm
Rare earth elements=trace levels—500 ppm
Ti=levels—500 ppm
O=trace levels—200 ppm if the steel is obtained by means of powder metallurgy, or trace levels—50 ppm if the steel is obtained by means of production in air or under vacuum from liquid metal
N=trace levels—100 ppm
S=trace levels—50 ppm
Cu=trace levels—1%
P=trace levels—200 ppm
the remainder being iron and inevitable impurities resulting from the production operation;

forging the steel;

a softening tempering operation at 600-675° C. for from 4 to 20 hours followed by cooling in air;

solution heat treating at 900-1000° C. for at least 1 hour, followed by cooling in oil or air which is sufficiently rapid to prevent the precipitation of intergranular carbides in the austenite matrix; and hardening ageing at 475-600° C. for from 5-20 h, wherein Rm at ambient temperature is between 2200 and 2350 MPa.

2. Mechanical component according to claim 1, characterized in that the component is an engine transmission shaft.

3. Mechanical component according to claim 1, wherein the hardening ageing is from 490-525° C. for from 5-20 h.

4. Mechanical component according to claim 3, characterized in that the component is an engine transmission shaft.

5. Mechanical component according to claim 1, wherein the method further comprises a cryogenic processing operation at −50° C. or lower in order to convert all the austenite into martensite, the temperature being 200° C. or more lower than Ms, at least one of the processing operations lasting at least 2 hours, wherein the cryogenic processing operation is carried out between the cooling in oil or air and the hardening ageing.

6. Mechanical component according to claim 5, wherein the cryogenic processing operation is at −80° C. or lower.

7. Mechanical component according to claim 6, wherein the cryogenic processing operation is followed by stress relieving operation.

8. Mechanical component according to claim 1, wherein Rm is about 1800 MPa at 400° C.

9. Mechanical component according to claim 1, wherein Rp0.2 is from 1959 to 2135 MPa.

10. Mechanical component according to claim 1, wherein C=0.20-0.25%.

* * * * *